United States Patent
Wallentin et al.

(10) Patent No.: US 10,944,750 B2
(45) Date of Patent: Mar. 9, 2021

(54) ACCESS CATEGORY HANDLING FOR WIRELESS COMMUNICATION SYSTEMS

(71) Applicant: TELEFONAKTIEBOLAGET LM ERICSSON (PUBL), Stockholm (SE)

(72) Inventors: Pontus Wallentin, Linköping (SE); Christofer Lindheimer, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/482,554

(22) PCT Filed: Dec. 21, 2017

(86) PCT No.: PCT/IB2017/058309
§ 371 (c)(1),
(2) Date: Jul. 31, 2019

(87) PCT Pub. No.: WO2018/142203
PCT Pub. Date: Aug. 9, 2018

(65) Prior Publication Data
US 2020/0008134 A1  Jan. 2, 2020

Related U.S. Application Data

(60) Provisional application No. 62/454,359, filed on Feb. 3, 2017.

(51) Int. Cl.
*H04W 4/00* (2018.01)
*H04L 29/06* (2006.01)
*H04W 4/90* (2018.01)
*H04W 48/14* (2009.01)
*H04W 48/16* (2009.01)
*H04W 72/00* (2009.01)
*H04W 12/08* (2021.01)

(52) U.S. Cl.
CPC ............... *H04L 63/10* (2013.01); *H04W 4/90* (2018.02); *H04W 12/08* (2013.01); *H04W 48/14* (2013.01); *H04W 48/16* (2013.01); *H04W 72/005* (2013.01)

(58) Field of Classification Search
CPC ........ H04W 4/90; H04W 48/14; H04W 48/16
See application file for complete search history.

(56) References Cited

U.S. PATENT DOCUMENTS

| | | | |
|---|---|---|---|
| 2011/0201307 A1 | 8/2011 | Segura | |
| 2011/0274040 A1* | 11/2011 | Pani | H04W 74/006 370/328 |
| 2014/0128029 A1 | 5/2014 | Fong et al. | |
| 2015/0036489 A1 | 2/2015 | Rajadurai et al. | |
| 2016/0014632 A1 | 1/2016 | Siow et al. | |
| 2016/0073288 A1* | 3/2016 | Patil | H04W 28/0289 370/230 |
| 2016/0219493 A1 | 7/2016 | Kim et al. | |

(Continued)

*Primary Examiner* — Elisabeth Benoit Magloire

(57) ABSTRACT

A method of access control performed by a user equipment (UE) is disclosed. The method comprises being triggered to perform an access request and evaluating whether one or more access category rules are satisfied by the trigger. The method further comprises determining, based on the evaluation, and access category to apply. The method further comprises performing a barring check, applying the access category determined based on the evaluation.

22 Claims, 9 Drawing Sheets

(56) References Cited

U.S. PATENT DOCUMENTS

| | | | |
|---|---|---|---|
| 2016/0219522 A1* | 7/2016 | Asterjadhi | H04W 52/0216 |
| 2016/0255501 A1* | 9/2016 | Van Phan | H04W 76/19 |
| | | | 713/153 |
| 2017/0013501 A1 | 1/2017 | Kim et al. | |
| 2017/0041854 A1 | 2/2017 | Kim et al. | |
| 2017/0048833 A1* | 2/2017 | Lu | H04W 68/02 |
| 2017/0135025 A1* | 5/2017 | Koskinen | H04W 48/02 |
| 2017/0206095 A1* | 7/2017 | Gibbs | G06F 3/011 |
| 2018/0027444 A1* | 1/2018 | Maria | H04W 28/0289 |
| | | | 370/235 |

* cited by examiner

US 10,944,750 B2

ACCESS CATEGORY HANDLING FOR WIRELESS COMMUNICATION SYSTEMS

This application is a 371 of International Application No. PCT/IB2017/058309, filed Dec. 21, 2017, which claims the benefit of U.S. Provisional Application No. 62/454,359, filed Feb. 3, 2017, the disclosures of which are fully incorporated herein by reference.

TECHNICAL FIELD

The present disclosure relates, in general, to wireless communication systems and, more particularly, to methods and apparatuses for managing messages related to access control mechanisms.

BACKGROUND

When performing access to a wireless communication system, a user equipment (UE) must signal to the network that it wants to acquire communication opportunities. There are many schemes for how this can be done. For example, a UE can utilize specific air interface resources (e.g., times, frequencies, etc.) to send a short message that would indicate to the network that a UE wants to communicate. Further details about a certain communication need can then occur in subsequent communication(s).

For wireless communication systems pursuant to 3GPP EUTRAN/LTE standard specifications, an example of this process can be seen in the flow diagram of FIG. 1, which shows random access and Radio Resource Control (RRC) connection establishment. A request for communication can start with a transmission of a random access preamble (401) on specifically allocated channels or resources. This random access preamble is, when received by a base station or eNB, followed by a random access response (402) that includes an allocation of resources for continued signaling (403-405). For the sake of brevity, these signals are not explained in detail here.

As can be recognized, an access attempt will cost air interface resources for the subsequent signaling required to, e.g., configure and setup communication resources for user data transfer. It should be noted that even further communication is needed with network entities before any communication can take place. For the sake of brevity, these additional details are omitted from FIG. 1.

Under certain circumstances, it is desirable to prevent UEs from making these access attempts. For example, in case of an overload situation like radio resource congestion or shortage of processing capabilities, a network may wish to reduce overload by denying access to a cell or a portion thereof. The network may also need to prioritize between specific users and/or services during overload situations. For example, the network may give priority to emergency calls compared to ordinary calls.

To this end, the network may employ what is in 3GPP referred to as access control. Access Class Barring (ACB) is an example of one such control. In short, access barring is about preventing or making it less likely that a UE will attempt access, and in this way, reduce the total load caused by access requests from UEs. For example, a given UE may belong to a certain access class, and the network may communicate, via broadcasted system information, that certain classes at certain instances are barred (i.e., not allowed to make access) or allowed to make access with a lower probability if not barred altogether. When a UE receives this broadcasted system information, if it belongs to a barred access class, it may result in that a UE will not send an access request. There are multiple variants of access barring mechanisms specified for LTE, some of which are listed and described at a high level of detail below.

1. Access Class Barring as per 3GPP Rel-8: In this mechanism, it is possible to bar all access requests from a UE. Normal UEs in Access Class (AC) range 0-9 are barred with a probability factor, also referred to as barring factor, and a timer, also referred to as barring duration, whereas specific classes can be controlled separately. In addition to the normal classes 0-9, additional classes have been specified to control the access to other type of users, e.g. emergency services, public utilities, security services, etc.
2. Service Specific Access Control (SSAC): The SSAC mechanism allows a network to prohibit Multi-Media Telephony (MMTel)-voice and MMTel-video accesses from a UE. The network broadcasts barring parameters (parameters similar to ACB) and a barring algorithm that is similar to ACB (barring factor and random timer). An actual decision if access is allowed is done in the IP Multi-Media Subsystem (IMS) layer of a UE.
3. Access control for Circuit-Switched FallBack (CSFB): The CSFB mechanism allows a network to prohibit CSFB users. A barring algorithm used in this case is similar to ACB.
4. Extended Access Barring (EAB): The EAB mechanism allows a network to prohibit low priority UEs. Barring is based on a bitmap in which each access class (AC 0-9) can be either barred or allowed.
5. Access class barring bypass: This ACB mechanism allows omitting access class barring for IMS voice and video users.
6. Application specific Congestion control for Data Communication (ACDC) barring: ACDC allows barring of traffic from/to certain application(s). In this solution, applications are categorized based on global application identification (ID) (in Android or iOS). The network broadcasts barring parameters (barring factor and timer) for each category.

Thus, different LTE UEs from different releases and, depending on their capabilities, support or do not support one or more of the defined barring schemes. Most of the barring schemes introduced after Rel-8 targeted very specific use cases and made certain assumptions on the reason barring is needed. For example, SSAC was introduced to protect the operators of an IMS network from too many IMS requests. On the other hand, the "Access Barring Skip" functionality should allow IMS traffic (like voice) but bar other services under the assumption that the bottleneck is in the RAN.

For LTE, some access barring features were introduced since a problem in the field had already been observed whereas others were proposed since specific problems were expected to occur.

Some of the problems vanished over time and others hardly ever occurred. The introduction of each of these access barring variants required substantial efforts both to standardize and design in products, as well as to maintain.

For LTE, the use of multiple access barring mechanisms results in that the broadcasted system information to control the access barring has grown to be very large. This consumes radio resources but also prolongs the time a given UE has to spend by reading this system information before it can make access to the system.

SUMMARY

To address these issues and avoid future problems with potentially even further additions to the access barring mechanisms currently specified, there is now a desire from the industry to replace the solutions with a more generic and unified solution, that can consider both old requirements and be better prepared for new demands. Thus, it is an objective of the present disclosure to address the shortcomings of previous access barring solutions.

According to certain embodiments, a method of access control performed by a user equipment (UE) is disclosed. The method comprises the UE being triggered to perform an access request and evaluating whether one or more access category rules are satisfied by the trigger. The method further comprises determining, based on the evaluation, an access category to apply. The method further comprises performing a barring check, applying the access category determined based on the evaluation.

In certain embodiments, when no access category rules are satisfied by the trigger, a default access category rule is selected. In certain embodiments, when a plurality of access category rules is satisfied by the trigger, one of the plurality of access category rules is selected based on a priority scheme. In certain embodiments, the determined access category is determined based on the selected access category rule.

Also disclosed is a user equipment (UE) configured to perform access control. The UE comprises a wireless interface and processing circuitry coupled to the wireless interface. The processing circuitry is configured to be triggered to perform an access request and evaluate whether one or more access category rules are satisfied by the trigger. The processing circuitry is further configured to determine, based on the evaluation, an access category to apply. The processing circuitry is further configured to perform a barring check, applying the access category determined based on the evaluation.

In certain embodiments, when no access category rules are satisfied by the trigger, a default access category rule is selected. In certain embodiments, when a plurality of access category rules is satisfied by the trigger, one of the plurality of access category rules is selected based on a priority scheme. In certain embodiments, the determined access category is determined based on the selected access category rule.

Also disclosed is a method performed by a network node. The method comprises providing, to a UE, barring information relating to one or more access categories, wherein one of the one or more access categories is used by the UE to perform a barring check. The method further comprises receiving an access request from the UE when the barring check is passed.

In certain embodiments, the barring information comprises barring factors and barring time. In certain embodiments, the access category used by the UE to perform a barring check is selected based on a default access category rule. In certain embodiments, the access category used by the UE to perform a barring check is selected based on a priority scheme. In certain embodiments, the access category used by the UE to perform a barring check is a pre-determined access category.

Also disclosed is a network node. The network node comprises processing circuitry and a wireless interface coupled to the processing circuitry. The wireless interface is configured to provide, to a UE, barring information relating to one or more access categories, wherein one of the one or more access categories is used by the UE to perform a barring check. The wireless interface is further configured to receive an access request from the UE when the barring check is passed.

In certain embodiments, the barring information comprises barring factors and barring time. In certain embodiments, the access category used by the UE to perform a barring check is selected based on a default access category rule. In certain embodiments, the access category used by the UE to perform a barring check is selected based on a priority scheme. In certain embodiments, the access category used by the UE to perform a barring check is a pre-determined access category.

Certain embodiments of the present disclosure may provide one or more technical advantages. For example, certain embodiments allow for both higher layers and radio layers to control access categories used by a UE. In addition, the disclosure also addresses special cases, when for example rules provided from higher layers are inconsistent in themselves or inconsistent with rules received from lower (e.g., radio) layers. In situations when the UE has received no rules, it will anyway be able to select an access category for accessing the network. Certain embodiments also limit the amount of information that must be broadcast by the RAN. According to certain embodiments, a single set of access categories can be broadcast instead of several. All aspects, present and future, are instead included in rules for determining an access category rather than generating further access categories to broadcast information for. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

The technology described herein can be used in various wireless systems and is not restricted to 3GPP EUTRA/LTE systems and 3GPP Next Generation systems (also known as the 5G System—5GS), deploying New Radio (NR), even though such systems will serve as examples. Access control is a mechanism that may be applicable to any system where user, service, and/or other differentiation and load management of access is needed. Other examples may be wireless access pursuant to IEEE 802 standards, such as IEEE 802.11 WLAN standard or the IEEE 802.16 standard, but also 3GPP GSM evolutions.

Figure 2:
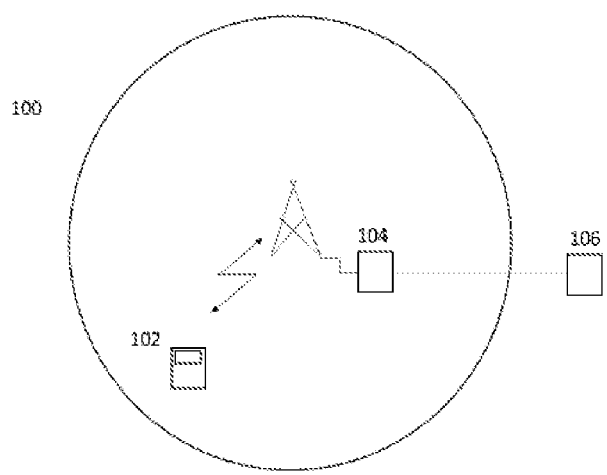
FIG. 2 illustrates a wireless communications network according to embodiments of the present disclosure.

Referring now to FIG. 2, a wireless access network is illustrated, for example pursuant to 3GPP LTE/EUTRA specifications. The figure is very simplified to put focus on entities important to explain the disclosed embodiments. In the wireless access network, 100, a UE (102) is illustrated. The UE (102) can request access to and communicate with an access node (104). The access node (104) is in turn connected to a node (106) that, for example, can provide internet access. In LTE, the access node is commonly referred to as eNB, whereas in other standards, it may be referred to as Node B, Base Station, or simply Access Point. In the evolution of next generation radio in 3GPP, the access node is sometimes referred to as "gNB". It should be noted that the illustration in FIG. 2 is traditional in the sense that it provides a view of "physical entities", but to a person skilled in the art, it would be understood that for example an access node (104) or a node (106) can be implemented using distributed or cloud-based processing capacity. Similarly, they can also be implemented in the same physical entity. For purposes of this example, the description will associate the nodes with certain functionality rather than restricting to certain implementations.

The access node (104) communicates user information and signaling to and from the network node to the UE. The wireless access network 100 is illustrated as a circle and contains in this figure only one "cell" area and one access node (104). It should be understood that any access network usually contains several access nodes and thus several areas and/or cells are thus served.

The node (106) can be one of many nodes. For example, it may be a control node (e.g., an MME, Mobility Management Entity, or an AMF, Access and Mobility Management Function), for communicating control information with the UE, or it may be a user plane node (SGW, Serving Gateway, or a UPF, User Plane Function), for communicating user data information to the UE. Further, the node may be connected with other nodes and work as a relay for information from these nodes to the UE. Such other nodes may for example be a packet gateway (PGW), a Data Network (DN) or similar. The node (106) and other similar nodes will be referred to as belonging to higher layers in this description.

Figure 3:
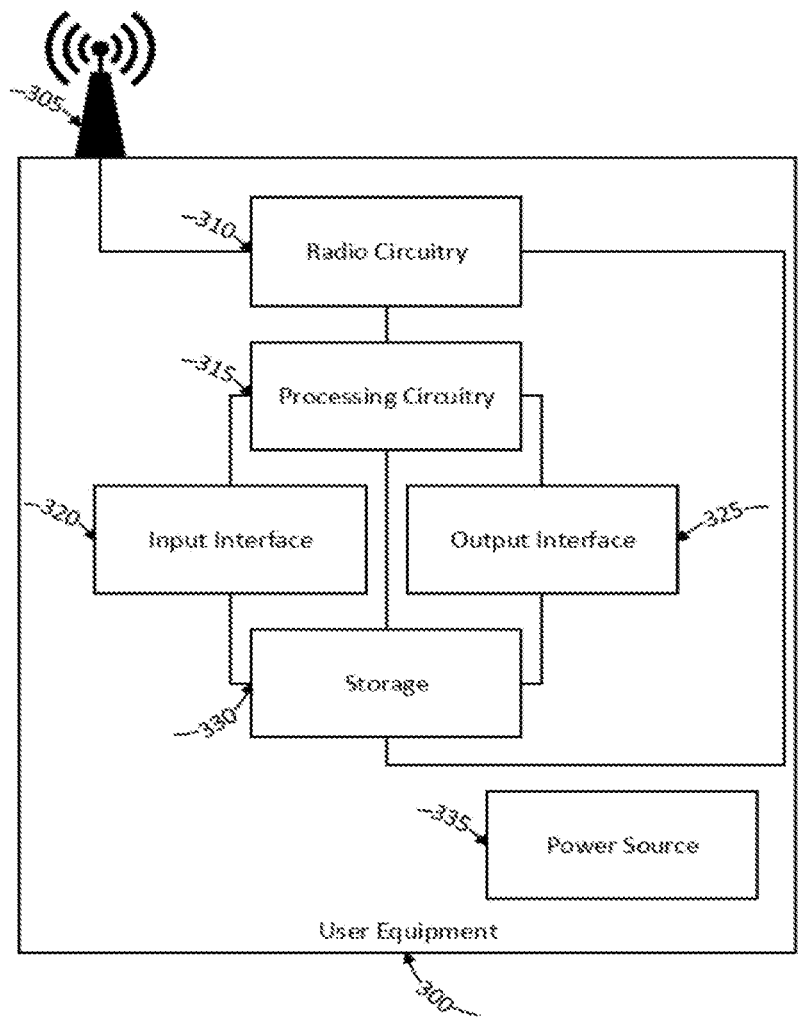
FIG. 3 illustrates a user equipment (UE) according to embodiments of the present disclosure.

FIG. 3 is a schematic diagram of a user equipment 300 as an example wireless device, in accordance with certain embodiments. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media, and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 3 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, WiFi, or Bluetooth wireless technologies. These wireless technologies may be integrated into the same or different chipsets and other components within wireless device 300.

Figure 1:
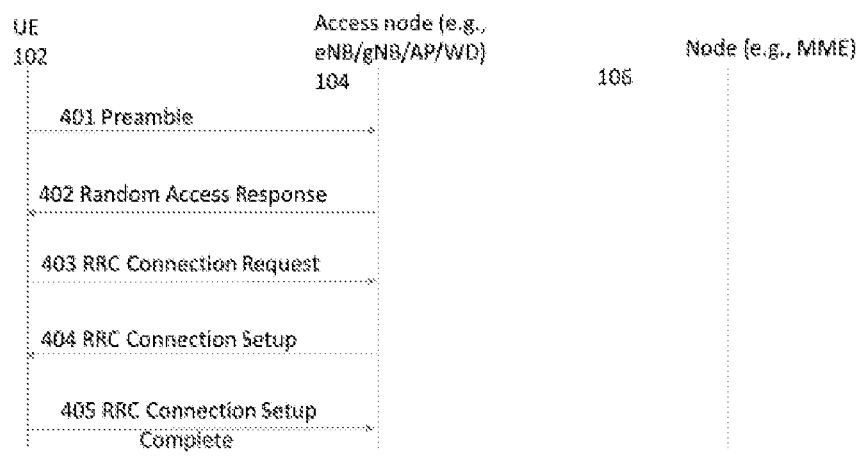
FIG. 1 illustrates a signaling diagram related to an RRC connection.
Figure 4:
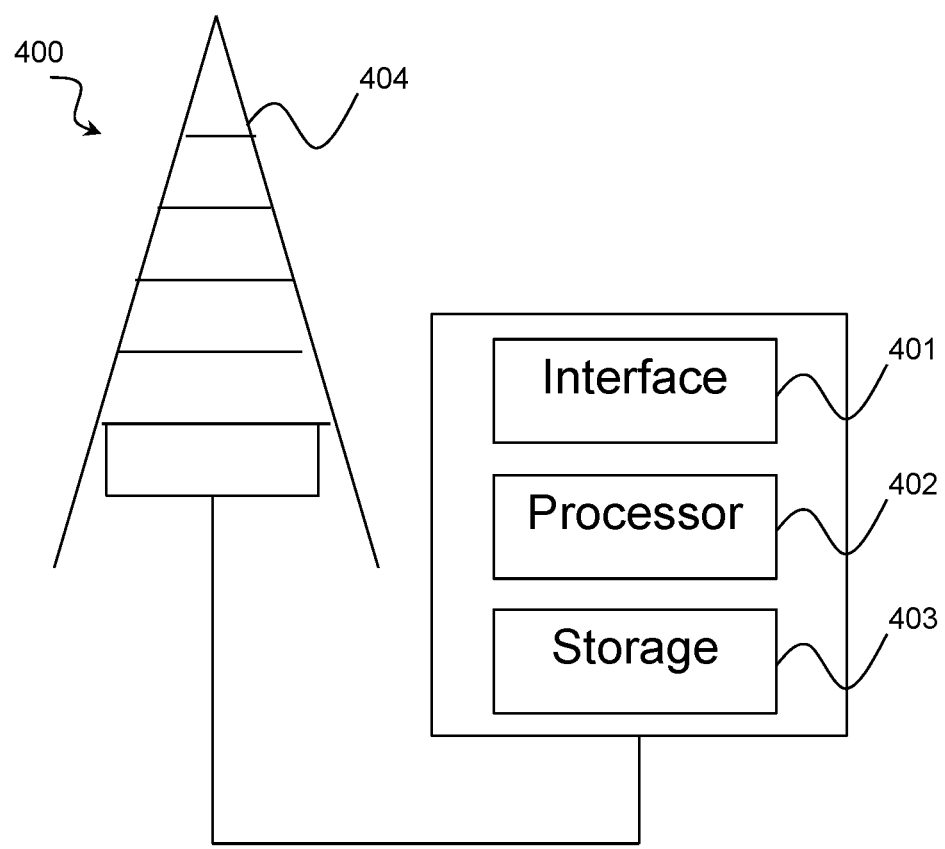
FIG. 4 illustrates a network node according to embodiments of the present disclosure.

FIG. 4 is a schematic diagram of a network node 400. According to certain embodiments, network node 400 may correspond to access node 104 and/or node 106 of FIG. 1, or any other suitable node operating in a wireless communications network. Network node 400 comprises interface 401, processor 402, storage 403, and antenna 404. These components may work together in order to provide network node functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment or nodes in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, AMFs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 4, network node 400 comprises processor 402, storage 403, interface 401, and antenna 404. These components are depicted as single boxes located within a single larger box. In practice however, a network node may comprise multiple different physical components that make up a single illustrated component (e.g., interface 401 may comprise terminals for coupling wires for a wired connection and a radio transceiver for a wireless connection). As another example, network node 400 may be a virtual network node in which multiple different physically separate components interact to provide the functionality of network node 400 (e.g., processor 402 may comprise three separate processors located in three separate enclosures, where each processor is responsible for a different function for a particular instance of network node 400). Similarly, network node 400 may be composed of multiple physically separate components (e.g., a NodeB component and a RNC component, a BTS component and a BSC component, etc.), which may each have their own respective processor, storage, and interface components. In certain scenarios in which network node 400 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 403 for the different RATs) and some components may be reused (e.g., the same antenna 4004 may be shared by the RATs).

Processor 402 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 400 components, such as storage 403, network node 400 functionality. For example, processor 402 may execute instructions stored in storage 403. Such functionality may include providing various wireless features discussed herein to a wireless device, such as UE 300, including any of the features or benefits disclosed herein.

Storage 403 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 403 may store any suitable instructions, data or information, including software and encoded logic, utilized by network node 400. Storage 403 may be used to store any calculations made by processor 402 and/or any data received via interface 401.

Network node 400 also comprises interface 401 which may be used in the wired or wireless communication of signalling and/or data between network node 400, network 100, and/or UE 300. For example, interface 401 may perform any formatting, coding, or translating that may be needed to allow network node 400 to send and receive data from network 100 over a wired connection. Interface 401 may also include a radio transmitter and/or receiver that may be coupled to or a part of antenna 404. The radio may receive digital data that is to be sent out to other network nodes or wireless devices via a wireless connection. The radio may convert the digital data into a radio signal having the appropriate channel and bandwidth parameters. The radio signal may then be transmitted via antenna 404 to the appropriate recipient (e.g., UE 300).

Antenna 404 may be any type of antenna capable of transmitting and receiving data and/or signals wirelessly. In some embodiments, antenna 404 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

During evolution of the 5G System, a novel concept has been introduced, denoted slicing. A slice, also known as network slice, is a new concept in 3GPP and refers to an end-to-end network realization or a set of network functions and resources that form a complete instantiated logical network, to meet a certain network characteristic. It can be compared with a way to view a "virtual" network, rather than a physical network. A slice can have various characteristics such as ultra-low latency. For example, a slice can provide its users with functionality that secure latency aspects such that latency is never higher than a certain requirement. To meet this, a set of network functions may be needed, e.g., functionality that secures very short interruptions or delays at handover. Other slices, that may be realized using the same access nodes (104, 400) and network nodes (106, 400), or others, may have other characteristics. There may for example be slices that doesn't even include a mobility function, as all users served through the slice may be stationary. These two examples show that to realize a service for different types of users, different functionalities may be needed, and each of these sets of functionalities are related to a slice realization. The slice can also be viewed as a method to isolate resources and perform separate management. For example, if a certain slice realization is of very high priority, certain processing resources may be reserved such that lower priority slices cannot utilize them. The concept of slicing is currently under development. An individual slice is identified by its Slice ID, in 3GPP also known as S-NSSAI (Single Network Slice Selection Assistance Information).

According to one embodiment of the present disclosure, before a UE performs access towards an access node, it needs to read certain system information. The system information describes how access should be performed to initiate communication between the UE (102) and the access node (104, 400). Part of this system information may be information related to access barring. This barring information is usually broadcasted in the access network 100 and there can be different barring information in different cells or areas. Usually, one access node (104, 400) will transmit its own barring information. The barring information may be arranged in a way such that it includes a set of access categories [1 . . . m] and for each category, information elements containing a barring factor and a barring time, for example as specified in 3GPP TS 36.331 v.14.1.0, 2016-12 (see table below). This barring information per access category will be used by the UE attempting access and it is a way for the access node to limit and prioritize certain accesses over other.

TABLE 1

Example of access category- barring time and barring factors.

```
BarringPerACDC-Category-r13 ::= SEQUENCE {¶
  → acdc-Category-r13→ → →      INTEGER (1..maxACDC-Cat-r13),¶
  → acdc-BarringConfig-r13→ → →   SEQUENCE (¶
  → → ac-BarringFactor-r13 → →    → ENUMERATED (¶
  → → → → → → → → →               → → p00, p05, p10, p15, p20, p25, p30, p40,¶
  → → → → → → → → →               → → p50, p60, p70, p75, p80, p85, p90, p95),¶
  → → ac-BarringTime-r13→ → →     → ENUMERATED (s4, s8, s16, s32, s64, s128, s256, s512)¶
  → } → → → → → → →               → → OPTIONAL → -- Need OP¶
```

Figure 5:
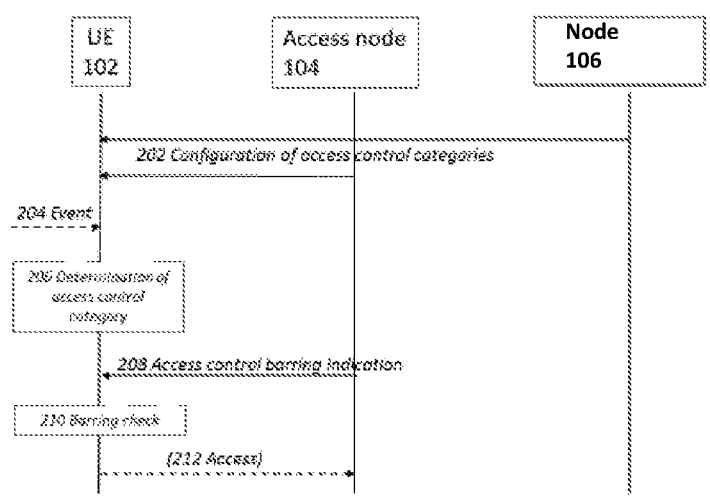
FIG. 5 illustrates a signaling diagram according to embodiments of the present disclosure.

Before an access is attempted by a UE (102), it needs to apply an access category of the [1 . . . m] access categories. According to certain embodiments, to determine what access category to use, the UE is provided with instructions or rules from the network. FIG. 5 illustrates a signaling diagram for one exemplary procedure.

In a first step 202, a node provides rules for which access category to use, based on considerations that relate to higher layers. In FIG. 5, this information is illustrated as originating from the node (106) but may very well also originate from other network nodes and be transmitted to the UE via node (106). If the network includes a higher level controller or policy functionality it may originate from another node hosting such controller or policy functionality. The higher layer rules may be signaled to the UE via Non-Access-Stratum (NAS) signalling, or it may be signaled using other protocols. For example, the UE (102) may include an entity that can be configured with and host access category rules signaled using an OMA-DM device management protocol.

Included in the rules from the node (106) could be information related to for example, how a UE should select access category if the access is triggered by a certain service. Examples of such services can be for example an emergency service or an MMTel Service. Further, the rules can include information related to how a UE should select access category if an access is triggered by a certain application, such as, e.g., a certain game or a certain social media application. Rules can also include information related to access to various slices. For example, a small device-UE/IoT UE (102), may want to access, e.g., an IoT-optimized slice. Further, it is not uncommon that radio networks are shared between different operators or that one and the same operator is using different Public Land Mobile Network (PLMN) codes. There could be different rules for selecting access category dependent on if access is to occur for different PLMN's.

It should be noted that step 202 may also include signaling from the access node (104). Signaling of rules for selecting an access category may also be sent from the access node (104), e.g., in particular when it comes to access category selection for accesses that are triggered by, e.g., signaling with the access node. This may be referred to as Radio Access Network (RAN) signaling and may be communicated, e.g., using a Radio Resource Control (RRC) communications protocol.

Figure 6:
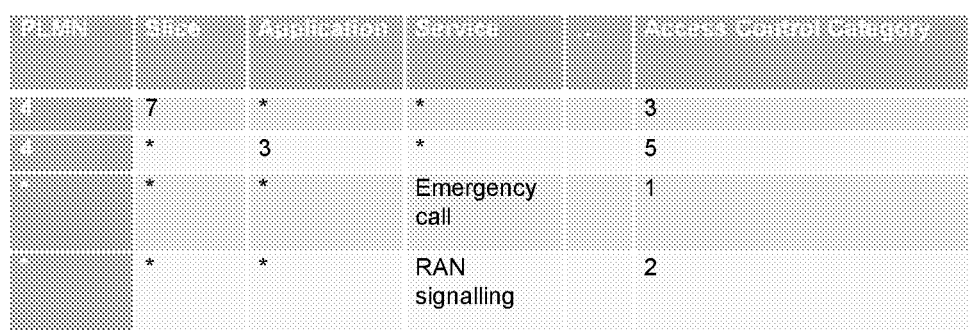
FIG. 6 illustrates a table with access categories mapped for a set of rules according to embodiments of the present disclosure.

It should be noted that the rules for determining a certain access category for an access can take into considerations one or several aspects simultaneously. This is illustrated in FIG. 6. FIG. 6 illustrates an illustrative set of aspects considered, for which rules have been received from the network (node (106) and/or access node (104)) and the example illustrates. Each row corresponds to a rule which may have been received from the network. Before the UE performs an access request, the UE evaluates these rules in order to determine which access control category this access attempt would correspond to and, in this way, be able to perform a barring check.

For each rule, there are columns with conditions that have to be met in order for this rule to be met as well as the resulting access control category when the rule is met. Looking at the first row in the table, it is illustrated that Access Control category 3 should be used if this rule is met. The conditions to be met are that a UE is accessing PLMN 4 and Slice ID 7, but it is irrelevant what application and what service that is accessed as a wildcard (*) is present in these columns. The second row illustrates a second rule where the conditions to be met are that all slices and all services (as both slice and service are marked with wildcard) with application 3 in PLMN 4 should use access category 5 if this rule is met.

From the access node (102) it can be seen that rules were provided in step 202 indicating that access category 2 should be used for RAN signaling. It should be noted that the table in FIG. 6 may result in an inconsistent result in case multiple rules are met. For instance, the rules in the first and second rows are both met in case an access is made with application 3 on slice 7 in PLMN 4. If two rules are met, it may therefore result in two different access control categories (3 and 5). This should be avoided or accounted for.

According to another aspect of the present disclosure, ambiguous situations like this, and others, are solved by simply specifying that, e.g., the access category categories of highest rank are always selected in case of ambiguity. In the example above, when first and second rules (rows) are both met, access control category 3 has a higher rank than 5, and therefore the first rule resulting in access control category 3 will be selected. As an alternative, each rule itself is associated with a priority, which may be received by the network, and the rule with higher priority will be selected when multiple rules are met. As another alternative, the UE itself selects which rule that has precedence by random selection, using a hash of the UE identity (such as the IMSI) or in some other suitable way. If certain accesses that are triggered cannot find a rule that is met and therefore would not result in a determination of an access control category, there can also be a "Default" category signaled, which may be stored as part of a "default" rule in the table which is met in case no other rule is met.

Returning now to FIG. 5, in step 204, there is an event that triggers an access. This may be an event received by the UE, as shown in FIG. 5. Alternatively, event 204 may also include any event, decision, or trigger that takes place within the UE that triggers an access. Regardless, the UE (102) would assess the event using the rules and information received in step 202 and determine an access category to use in step 206. Based on the access category it will read the information broadcast (208) by the access node (104) including, e.g., barring factors and barring time for the selected category and next perform a barring check (210), executing on indicated barring factors and barring times for its selected access category.

It should be noted that it may be that by the UE (102) selected access category is not represented in the broadcast information from the access node (104). For example, the broadcast information may only include:

| | | |
|---|---|---|
| Access Category 1: | Barring Factor n | Barring Time tn |
| Access Category 3: | Barring Factor x | Barring Time tx |
| Access Category 7: | Barring Factor z | Barring Time Tz |

If a UE in step 206 has concluded that an access category other than 1, 3, or 7 should be used, there is a need for a rule on how to treat such UEs. With a pre-determined rule, there is no need to further create mechanisms that would require coordination of all information that is broadcast by the access node (104) and, e.g., various nodes (106). An exemplary rule according to one aspect of the present disclosure is to instead apply the closest access category for which information is broadcast, with a higher access probability or, if no such access category is broadcast, select access category with highest probability of being allowed access. With such a rule, in situations when there is no need to limit the amount of accesses, there would be no need for the node (106) to broadcast information about more than a very few access categories and thereby save broadcasting resources. E.g., broadcasting information about 1, 3, and 7, would in effect create 3 different access categories instead of m access categories [1 . . . m].

According to this particular example, the mapping would thus be that access category 1 and 2 is mapped to access category 1

Access category 3-6 is mapped to access category 3

Access category 7-m is mapped to access category 7.

This will significantly save broadcast resources. In step 212, the UE will send an access request (e.g., as described for LTE above) if the barring check (210) is passed.

A pre-determined rule, including the default access category, may also be stated in the specification.

Certain embodiments discussed herein are based on the UE (102) at some point in time having had a communications channel with the network and that rules are available in the UE, according to signaling in step 202. If this is not the case, like, e.g., prior to an initial communication, when the UE, e.g., may be fresh-out-of-the-store, performing (initial) attach or have moved to another area with other rules, there must also be an access category specified for the very initial access. This can for example be hardcoded, e.g., on the UE's subscriber identity Module (SIM/USIM), stated in the specification, or it can be broadcast as part of the access category information from the access node (106).

Figure 7:
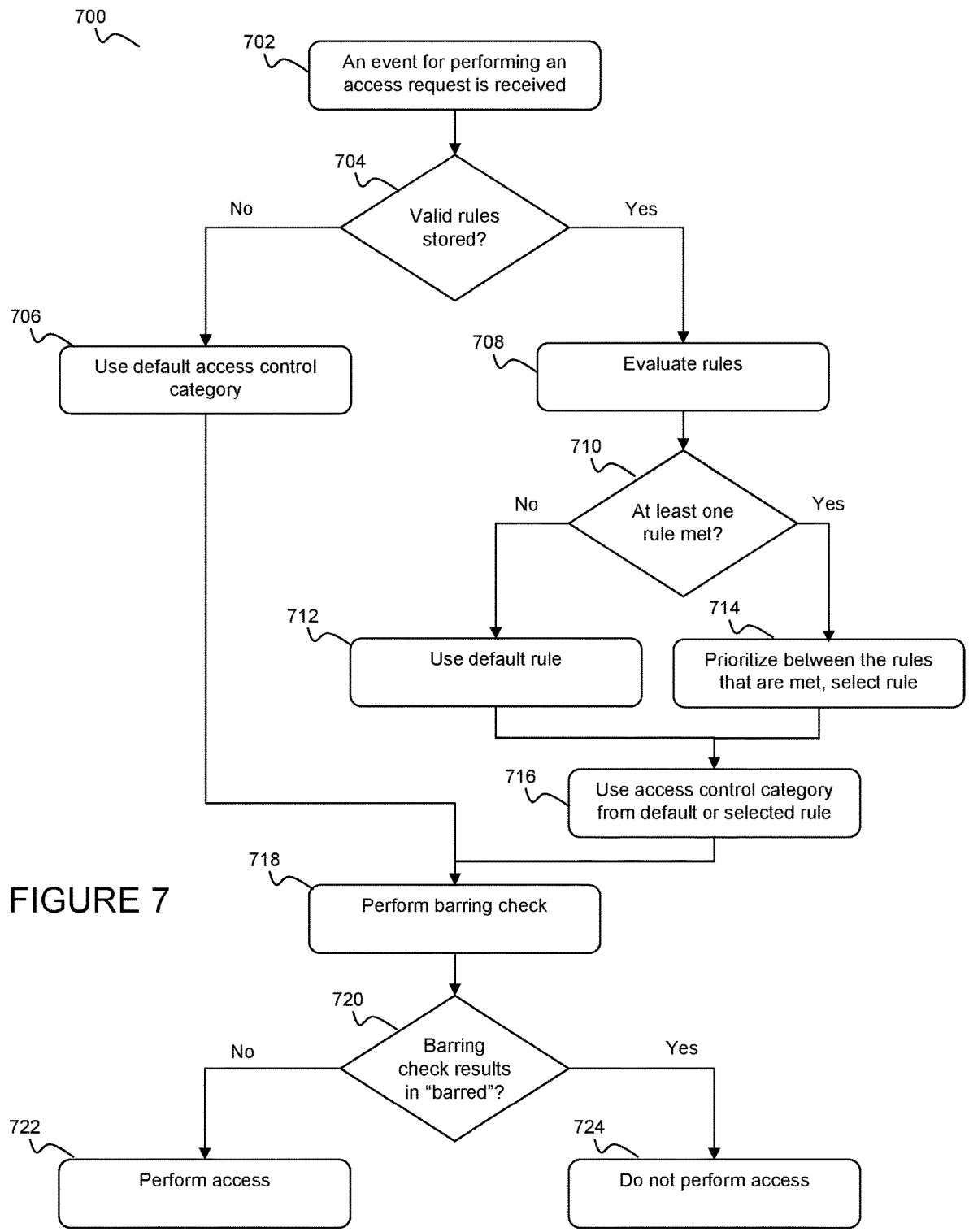
FIG. 7 illustrates a flow diagram according to embodiments of the present disclosure.

According to certain embodiments, a UE may perform a method 700 as illustrated in FIG. 7. At step 702, the UE receives or experiences an event, or trigger, to perform an access request. This trigger may be received or experienced from an application in the UE or from a signalling protocol entity such as RRC or a Non-Access Stratum protocol layer, or by a received page from the network. As used herein, it will be understood that these or any other occurrence that prompts the UE to perform an access request may be deemed an "event" or "trigger." At step 704, the UE (102) checks whether it has valid rules stored. In case the UE does, it moves to step 708 where it evaluates the one or more stored valid rules; otherwise it moves to step 706, where it uses "default" or pre-determined, access control category, e.g., as described above.

At step 710, if none of the stored valid rules are met, the UE may use a default or predetermined access control category or rule (712). Alternatively, if at least one rule is met, and if prioritization among a set of possible access categories can be used, a prioritization shall be done, such that one access control category is selected (714).

Regardless of the how access control category or access control rules are selected, at step 718 the UE performs a check against values valid for the selected access control category to determine if the check results in "barred" (720). If the barring check results in not barred, at step 722 an access should be performed, and if the barring check results in barred, at step 724, no access should be performed.

Figure 8:
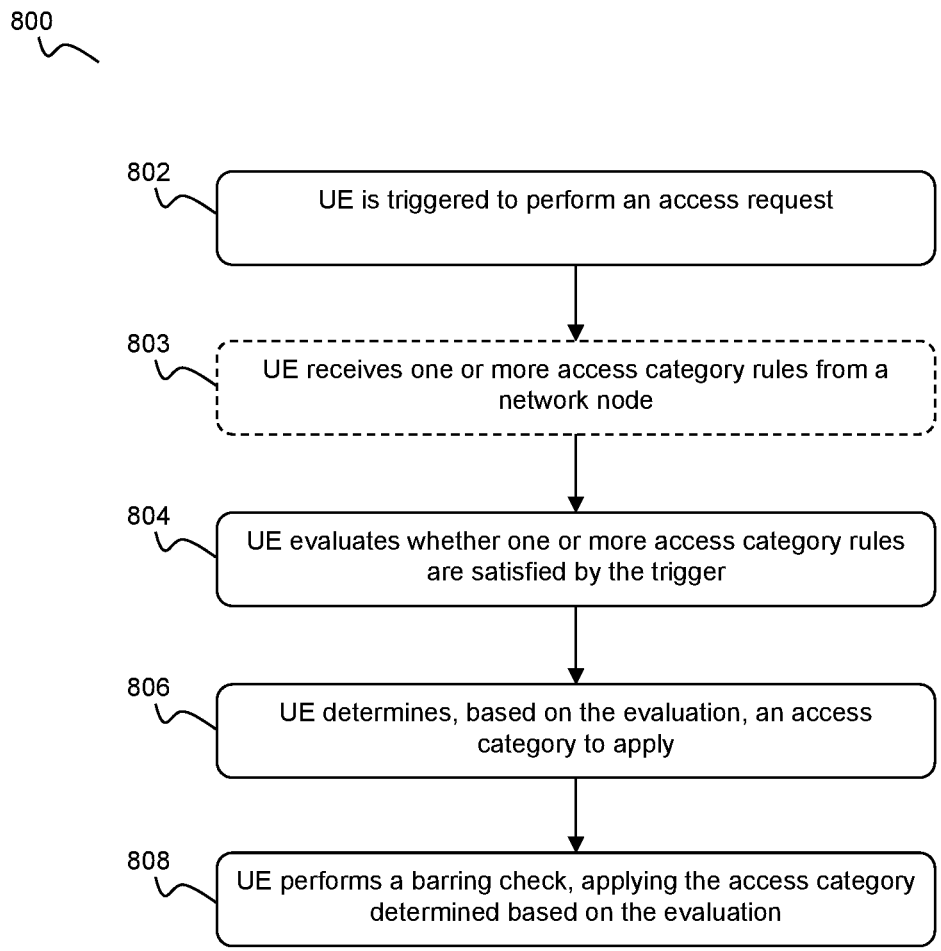
FIG. 8 illustrates a flow diagram according to embodiments of the present disclosure.

According to additional embodiments, a UE may perform a method 800 of access control as illustrated in FIG. 8. The method begins at step 802, when the UE is triggered to perform an access request. This may include any event, trigger, or occurrence that prompts the UE to perform an access request. According to certain embodiments, the trigger may be received or experienced from an application in the UE or from a signaling protocol entity such as RRC or a Non-Access Stratum protocol layer, or by a received page from the network. As used herein, it will be understood that these or any other occurrence that prompts the UE to perform an access request may be referred to as an "event" or "trigger."

At step 804, the UE evaluates whether one or more access category rules are satisfied by the trigger. Several non-limiting examples of these access category rules were discussed above with regard to FIG. 6. According to that illustrated embodiment, the rules may be based on one or more of PLMN, slice, application, and service. According to additional embodiments, the rules may be based on one or more of signaling, emergency communications, UE, frequency, and subscription type. This list is non-exhaustive, and it will be appreciated that access category rules may be based on additional criteria or any combination of the criteria discussed herein. An access category rule (e.g., rows in FIG. 6) may be deemed satisfied by the trigger if all of the criteria required by the rule (e.g., columns in FIG. 6) are satisfied.

According to certain embodiments, at step 804 it may be determined that no access category rules are satisfied by the trigger. This may occur of various reasons—the UE may not have an access category rules stored; the UE may have access category rules stored, but none of them are satisfied by the trigger; etc. According to certain embodiments, when this occurs a default access category rule is selected by the UE. This default access category rule can be something that is defined by the network or by the UE.

According to certain embodiments, at step 804 it may be determined that more than one access category rule is satisfied by the trigger. Since this could result in different access categories being applied, the situation should be avoided. Therefore, according to certain embodiments, when more than one rule is satisfied, one of the plurality of satisfied access category rules is selected by the UE. According to certain embodiments, this selection may be based on a priority scheme. In some embodiments, this priority scheme may provide that the access categories associated with each rule have a ranking, and the category with a higher ranking is selected. In some embodiments, the rules themselves have an assigned priority or ranking, and the satisfied rule with a higher priority or ranking is selected. These various priority schemes may be assigned by the network or the UE. As yet another alternative embodiment, if multiple access category rules are satisfied by the trigger, the UE may select one rule based on a random selection (e.g., using a hash of the UE identity, or any other appropriate method of random selection).

According to certain embodiments, the various access category rules may be rule(s) stored in the UE, rule(s) received from a network node, a default access category rule, or some combination of the above.

At step 806, the UE determines, based on the evaluation at step 804, an access category to apply. According to certain embodiments, the access category is determined based on the selected access category rule. For instance, as seen in the example of FIG. 6, the rules each specify a corresponding access category. This is just one example, and other relationships between access category rules and access categories may be used to determine the access category to apply.

According to certain embodiments, when no access category rules are stored by the UE, a pre-determined access category may be applied. According to certain embodiments, when access category rules are stored by the UE, but none of them valid, a pre-determined access category may be applied. In either embodiment, the pre-determined access category may be chosen by the network or the UE.

At step 808, the UE performs a barring check, applying the access category determined at step 806. If the UE determines that access is barred, it does not attempt to perform access. If the UE determines that access is not barred, it proceeds to perform access.

According to certain embodiments, method 800 may include the optional step 803 of receiving one or more access category rules from a network node. These rules may be received via Non-Access Stratum (NAS) signaling, or they may be received via other signaling protocols. Although step 803 is shown as occurring after step 802 and before 804, it will be appreciated that step 803 may occur at any point during the method 800. Similarly, it will be appreciated that the various steps of method 800 may be reordered, as appropriate, within the scope of method 800, and certain steps may be performed at substantially the same time as one another.

Figure 9:
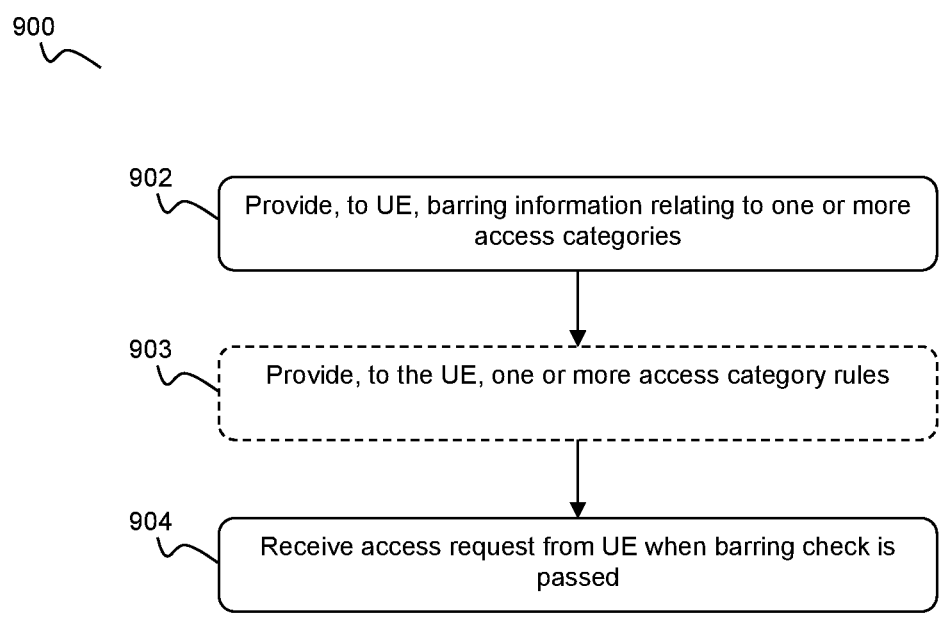
FIG. 9 illustrates a flow diagram according to embodiments of the present disclosure.

According to additional embodiments, a network node may perform a method 900 as illustrated in FIG. 9. The method begins at step 902, when the network node provides, to a UE, barring information relating to one or more access categories. One of these access categories is to be used by the UE to perform a barring check. According to certain embodiments, the barring information may comprise barring factors and barring time. According to certain embodiments, additional information or criteria may be included in the barring information. As discussed above with regard to FIG. 8, the access category used by the UE to perform a barring check may be selected in a variety of manners. According to certain embodiments, the selection may be based on a default access category rule, a priority scheme among rules and/or access categories, etc. According to additional embodiments, the access category itself may be a pre-determined access category. Furthermore, as detailed above, the various access categories may be based on a number of criteria, including, but not limited to service, signaling, emergency communications, UE type, slice, frequency, application, subscription type, and any combination thereof. At step 904, the network node receives an access request from the UE when a barring check is passed.

According to certain embodiments, method 900 may include the optional step 903 of providing one or more access category rules to the UE. These rules may be provided via Non-Access Stratum (NAS) signaling from a core network node, such as an MME or an AMF, or they may be provided via other signaling protocols. Although step 903 is shown as occurring after step 902 and before 904, it will be appreciated that step 903 may occur at any point during the method 900. Similarly, it will be appreciated that the various steps of method 900 may be reordered, as appropriate, within the scope of method 900, and certain steps may be performed at substantially the same time as one another.

It should be noted that the description is made assuming that there is an order in which access probability increases the lower the access category value. It is of course possible to reverse such that a higher access category value provides a higher probability to be allowed access, it is something that just needs to be agreed, to avoid otherwise necessary coordination between, e.g., access nodes (104) and nodes (106) on the meaning of an access category.

It should further be noted that at some points it must be allowed to change rules for access category determination, i.e., the content of signaling in step 202 of FIG. 5, step 803 of FIG. 8, or step 903 of FIG. 9. In one example, when the UE changes registration area, such a Tracking Area, it typically performs a registration procedure, or a Tracking Area Update procedure, with the network, such as with the node (106). As part of, or in conjunction with, this registration procedure the network may provide a new set of rules, which may as well partly or altogether, replace the previous set of rules stored in the UE. It should be noted that in this example, the network should assume that the same set of rules are used by a given UE are valid in all cells within a registration area.

In another example, the network broadcasts system information which indicates whether a set of rules are valid in the cell (510). For example, using a mechanism similar to the value tag used in the system information in LTE. In this case the set of rules provided to a UE is associated with a value tag (which is typically a number). In the broadcasted system information in each cell, the network indicates the value tag. If this value tag differs from the value tag associated with the stored rules of a given UE, the UE requests new rules from the network.

According to another aspect of the present disclosure, as rules are communicated both via the access node (104) and the node (106) it may be perfectly possible to define how access categories should apply and be used also when in different modes, like if it is connected with a signaling connection to at least one access node, if it is in idle mode with no signaling connection or if it is in any other, e.g., dormant or inactive state.

According to additional embodiments, a method in a wireless device (UE) for performing an access attempt to a second wireless device (UE) or network node (AP, gNB, eNB, etc.) is disclosed. The method comprises receiving, in a first wireless device, access category barring information that relates to access to the second wireless device or network node, said access category barring information including barring information for at least one access category. The method further comprises determining a determined access category, at least partially based on cause for access attempt, one access category that is applicable for said access attempt. The method further comprises evaluating, based on the determined access for access attempt and the received access category barring information, what barring information that is applicable for said access attempt. The method further comprises performing an access attempt, based on said evaluation.

According to additional embodiments of the method described above, the step of determining a determined access category is preceded by a step of receiving NAS Access Category rules via Non-Access Stratum signaling and wherein the determining step includes determining a determined access category at least partially based on received NAS Access Category rules. According to additional embodiments, the step of determining a determined access category is preceded by a step of receiving RRC Access Category rules via RRC Signaling and wherein the determining step includes determining a determined access category at least partially based on received RRC Access Category rules.

According to additional embodiments, the step of evaluating further includes a first check that the determined access category is represented in the received access category barring information and if it, perform access attempt with determined access category; and a second check that if the determined access category is not represented in the received access category barring information, perform access attempt with another access category than the determined access category. According to additional embodiments, said second check includes selecting a second access category for said access attempt, where said second access category is selected based on pre-determined rules available in the UE. According to additional embodiments, said pre-determined rules includes at least selecting an access category with a higher probability of access than said determined access category.

According to additional embodiments, the step of determining includes, in situations when rules received through Non-Access Stratum and Radio Resource Control signaling are incoherent, selecting one out of at least two access categories based on pre-determined rules available in the UE. Said pre-determined rules may include at least selecting one out of at least two access categories with the highest probability of access, according to said received access category barring information. According to additional embodiments, said pre-determined rules available in the UE are received through NAS signaling. According to additional embodiments, said pre-determined rules available in the UE are provided through a SIM/USIM. According to additional embodiments, said pre-determined rules available in the UE are encoded in UE SW.

According to additional embodiments, a method is disclosed in a network for providing access category rules to a UE comprising providing rules how to select access category based on at least one of Service, Slice, PLMN, Frequency, application, RRC signaling, MM Signaling, Emergency Calls-Voice, Emergency communication—packet data, subscription type, and UE type. According to additional embodiments, this method in a network further comprises providing access category rules to a UE on how to determine access category when simultaneously considering more than one Service, Slice, PLMN, Frequency, application, RRC signaling, MM Signaling, Emergency Calls-Voice, Emergency communication—packet data, subscription type, UE type. According to additional embodiments, said received rules are applicable throughout a registration area. According to additional embodiments, updates of NAS Access Category rules or RRC Access Category rules are updated in connection with a registration update procedure.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage may comprise computer readable means on which a computer program can be stored. The computer program may include instructions which cause processor (and any operatively coupled entities and devices, such as interface and storage) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors, possibly in cooperation with storage. Processors and storage may thus be arranged to allow processors to fetch instructions from storage and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method of access control performed by a user equipment (UE), the method comprising:
being triggered to perform an access request;
evaluating whether one or more access category rules are satisfied by the trigger;
determining, based on the evaluation, an access category to apply;
performing a barring check, applying the access category determined based on the evaluation;
when no access category rules are stored, performing a barring check, applying a predetermined access category; and
when no stored access category rules are valid, performing a barring check, applying a predetermined access category.

2. The method according to claim 1, wherein, when no access category rules are satisfied by the trigger, a default access category rule is selected.

3. The method according to claim 1, wherein, when a plurality of access category rules is satisfied by the trigger, one of the plurality of access category rules is selected based on a priority scheme.

4. The method according to claim 1, wherein one or more access category rules comprises one or more of the following:
   access category rules stored in the UE;
   access category rules received from a network node; and
   a default access category rule.

5. The method according to claim 1, further comprising:
   receiving one or more access category rules from a network node.

6. The method according to claim 1, wherein the access category rules are based on one or more of service, signaling, emergency communications, and UE type.

7. A User Equipment (UE) configured to perform access control, the UE comprising:
   processing circuitry configured to:
      be triggered to perform an access request
      evaluate whether one or more access category rules are satisfied by the trigger;
      determine, based on the evaluation, an access category to apply;
      perform a barring check, applying the access category determined based on the evaluation
      when no access category rules are stored, perform a barring check, applying a predetermined access category; and
      when no stored access category rules are valid, perform a barring check, applying a predetermined access category.

8. The UE according to claim 7, wherein, when no access category rules are satisfied by the trigger, a default access category rule is selected.

9. The UE according to claim 7, wherein, when a plurality of access category rules is satisfied by the trigger, one of the plurality of access category rules is selected based on a priority scheme.

10. The UE according to claim 7, wherein one or more access category rules comprises one or more of the following:
    access category rules stored in the UE;
    access category rules received from a network node; and
    a default access category rule.

11. The UE according to claim 7, wherein the wireless interface is further configured to receive one or more access category rules from a network node.

12. The UE according to claim 7, wherein the access category rules are based on one or more of service, signaling, emergency communications, and UE type.

13. A method performed by a network node, the method comprising:
   providing, to a user equipment (UE), barring information and access category rules relating to one or more access categories, wherein one of the one or more access categories is used by the UE to perform a barring check; and
   receiving an access request from the UE when the barring check is passed, wherein the network node instructs the UE that, when no access category rules provided to the UE are valid, a predetermined access category is to be used to perform the barring check.

14. The method according to claim 13, wherein the barring information comprises barring factors and barring time.

15. The method according to claim 13, wherein the access category used by the UE to perform a barring check is selected based on a default access category rule.

16. The method according to claim 13, wherein the access category used by the UE to perform a barring check is selected based on a priority scheme.

17. The method according to claim 13, wherein the access category rules are based on one or more of service, signaling, emergency communications, and UE type.

18. A network node, comprising:
   processing circuitry; and
   a wireless interface coupled to the processing circuitry, the wireless interface configured to:
      provide, to a user equipment (UE), barring information and access category rules relating to one or more access categories, wherein one of the one or more access categories is used by the UE to perform a barring check; and
      receive an access request from the UE when the barring check is passed
   wherein the network node is further configured to instruct the UE that, when no access category rules provided to the UE are valid, a predetermined access category is to be used to perform the barring check.

19. The network node according to claim 18, wherein the barring information comprises barring factors and barring time.

20. The network node according to claim 18, wherein the access category used by the UE to perform a barring check is selected based on a default access category rule.

21. The network node according to claim 18, wherein the access category used by the UE to perform a barring check is selected based on a priority scheme.

22. The method according to claim 18, wherein the access category rules are based on one or more of service, signaling, emergency communications, and UE type.

* * * * *